United States Patent [19]
Simons et al.

[11] 3,819,443
[45] June 25, 1974

[54] METHOD FOR MAKING MULTIFINNED SHIELDING TAPES

[75] Inventors: Herbert D. Simons, Long Valley, N.J.; Frank E. Timmons, Richmond, Ind.

[73] Assignee: Sun Chemical Corporation, New York, N.Y.

[22] Filed: Jan. 15, 1973

[21] Appl. No.: 323,950

[52] U.S. Cl............ 156/204, 29/624, 156/47, 174/36, 174/68 C, 174/117 FF
[51] Int. Cl............................. B29c 27/14
[58] Field of Search......... 29/624, 235; 156/47, 51, 156/52, 53, 54, 160, 163, 164, 204, 213; 138/111, 115, 116, 117; 174/70 R, 72 R, 68 C, 36, 117 F, 117 FF, 117 R

[56] References Cited
UNITED STATES PATENTS
2,538,019  1/1951  Lee....................................... 156/54
3,110,753  11/1963 Witort............................ 174/68 C X
3,110,754  11/1963 Witort et al.................... 174/68 C X
3,180,923  4/1965  Gow et al....................... 174/68 C X
3,476,869  11/1969 Hawkins............................ 174/68 C Primary Examiner—A. T. Grimley
Attorney, Agent, or Firm—Cynthia Berlow

[57] ABSTRACT

A method for forming longitudinal multifinned tapes by laminating a metal foil to a plastic film and then folding the laminate lengthwise plastic-to-plastic which is then placed fold-to-fold against another or plurality of same type folded laminates. A plastic film is then laminated across both surfaces of the plurality of plastic-to-plastic laminates with a resulting multifinned tape when opened at the plastic-to-plastic interfaces.

4 Claims, 12 Drawing Figures

PATENTED JUN 25 1974

METHOD FOR MAKING MULTIFINNED SHIELDING TAPES

This invention relates to multiconductor cables in general and more particularly relates to means for shielding certain of the conductors of a multiconductor cable from other conductors of the cable. It is an improvement over the shielding means disclosed in U.S. Pat. No. 3,622,683 issued Nov. 23, 1971, to W. L. Roberts et al. for Telephone Cable with Improved Crosstalk Properties.

As communications systems grow more complex, it becomes increasingly important to be able to transmit an increasing number of currents within the same cable, for example the transmission of telephone signals, video messages, and two-way data transmission. It is essential that the conductors be isolated electrically and physically from each other within the cable. It is also essential that the overall cable structure be compact, lightweight, and flexible and that the conductors therein be kept free from moisture.

In the communications industry it is common practice to use a floating or grounded shield of aluminum or copper between several sections of cable. This shield is generally but not necessarily totally sealed and moistureproof within an enclosure of plastic insulating film in order to keep the shield free from electrical contact with adjacent insulated conductors and free from damage and/or corrosion by moisture which may enter the cable and track the length of the shield.

The use of one tape to shield one conductor or a pair or a group of conductors from another conductor or pair or group of conductors, permitting simultaneous transmission of two separate currents of the same frequency within the same cable, is known, as in for example U.S. Pat. Nos. 3,032,604 and 3,622,683.

In accordance with the instant invention there is provided a longitudinal shielding tape having a wide variety of embodiments whereby the speed of manufacturing the cable and the shielding efficiency are increased, the volume and space within the cable are better utilized and foil corrosion is minimized.

In general the encapsulated film/foil laminated longitudinal multiconductor cable electrostatic shielding tapes of this invention are prepared by the steps of (A) forming a strip of a laminate of metal foil and plastic film bonded together by any suitable and conventional means with any suitable adhesive, such as a heat-fusible resin, a solvent-release rubber, or a solvent-release plastic base adhesive, and (B) folding the strip (A) upon itself.

The invention will be more fully understood from the following description of the accompanying drawings, in which.

Figure 1:
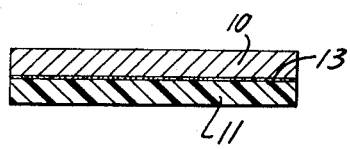
FIG. 1 is a cross-sectional view of a laminate of plastic film and metal foil.

Now referring to the figures, FIG. 1 illustrates the laminate of a metal foil 10 and a plastic film 11 which is the basis of the shielding tapes of this invention. The metal foil 10 may be any conductive metal normally used in the cable industry such as for example aluminum, copper, tinned copper, steel, silver, or the like.

The plastic film 11 may be any suitable insulation material such as for example a polyolefin, e.g., polyethylene or polypropylene; polyethylene terephthalate (Mylar); tetrafluoroethylene polymer (Teflon); polyvinyl chloride; polystyrene; polyvinylidene fluoride; a polyamide; a polycarbonate; or the like.

The adhesive interface 13 may be any suitable adhesive such as for example a polyolefin, a polyester, a polyvinyl chloride, or the like.

Figure 2:
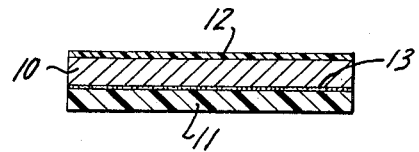
FIG. 2 is a cross-sectional view of a laminate of plastic film and metal foil with a heat-fusible coating on the metal foil.

Shown in FIG. 2 is essentially the same laminate as shown in FIG. 1 but with a heat-fusible coating 12 on the metal foil. The coating may be any suitable material such as for example polyethylene, polyester, polyvinyl chloride, or the like.

Figure 3:
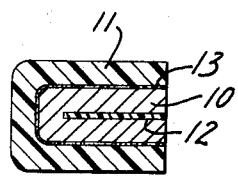
FIG. 3 is a cross-sectional view of an embodiment of a shielding tape showing the laminate of FIG. 2 folded upon itself with the plastic film on the outside.

The simplest embodiment of this invention is shown in FIG. 3. This structure is formed by the steps of 1 making a laminate of a metal foil 10 half the thickness required for shielding and a plastic film 11 of the thickness required for insulating the finished tape, (2) applying a heat-fusible coating 12 to the metal foil, (3) cutting the laminate to twice the width required, and (4) folding the laminate upon itself with the coated metal foil on the inside, forming a shielding tape with one folded edge insulated and the core heat-sealed to block moisture.

Figure 4:
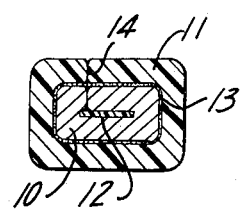
FIG. 4 is a cross-sectional view of an embodiment of a shielding tape showing the laminate of FIG. 2 folded upon itself from both edges.

FIG. 4 shows a second embodiment in which the laminate is folded upon itself from both ends, the edges being butted at fold gap 14 to form a tape that is watertight and thus protected from corrosion, and both edges are insulated.

Figure 5:
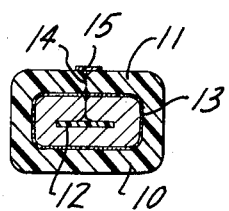
FIG. 5 is a sectional view of an embodiment of a shielding tape showing the folded laminate of FIG. 4 with a strip of plastic film over the fold gap.

In FIG. 5 the fold gap 14 is shown covered with a separate piece of insulating film 15 which is laiminated thereto by means of any suitable adhesive. The insulating film 15 may be the same as film 11 or different. This further protects the foil edges from corrosion and completely encapsulates the conductive foil in an insulating film.

Shielding tape systems for longitudinal parallel shielding of insulated wires and wire groups in compartmentalized multiconductor cables are also within the scope of this invention. These are made by the steps of (1) laminating by any known means a metal foil 10 and a plastic film 11, as in FIG. 1, (2) slitting the laminate to any desired width, (3) slitting heat-fusible coated plastic film 16 to the same width as the laminate in step (2), (4) folding the laminate from step (2) in half lengthwise plastic-to-plastic, (5) laying two folded laminate tapes from step (4) fold-to-fold and (6) laminating to each of the resulting faces a heat-fusible coated plastic film from step (3) in any known and convenient manner, as in FIG. 6. The plastic film 16 may be the same as film 11 or different.

The shielding tape from step (5) above is inserted into the ultimate cable by any suitable means, such as by feeding the tape from a pad directly into the cabler with the insulated single conductors or insulated groups. The shielded, compartmentalized multiconductor core can then be further processed, i.e., jacketed, sheathed, etc. As the tape is fed into the cabler it opens as in FIG. 7 to a system having four fins forming four longitudinal parallel shielding compartments, each basically pie-shaped or triangular in shape and having the same cross-sectional areas.

Figure 7:
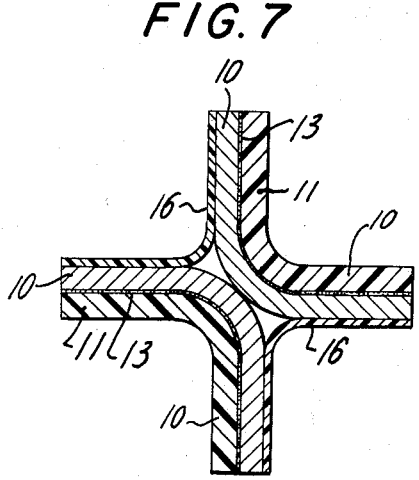
FIG. 7 is a cross-sectional view of the structure of FIG. 6 wherein the folded laminates of FIG. 1 have opened to form four compartments.
Figure 8:
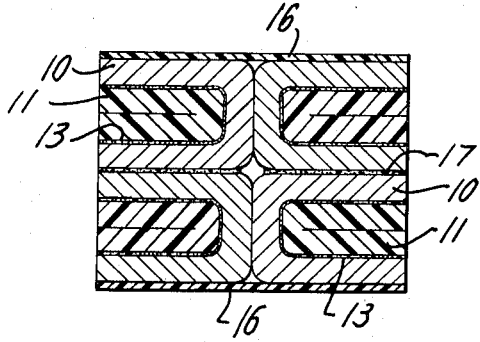
FIGS. 8 and 9 are cross-sectional views of embodiments of a shielding tape showing a plurality of folded laminates of FIG. 1 of equal lengths with a plastic film on the top and the bottom faces.
Figure 9:
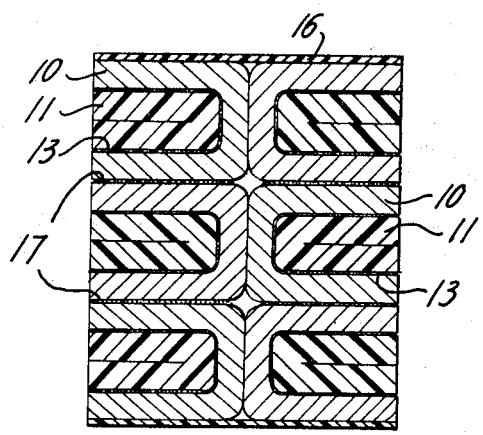

It is within the scope of this invention to vary the type and gauge of the film and/or of the foil. It is also within the scope of this invention to provide longitudinal multicompartmentalized shielding tapes having more than four fins and parallel compartments by varying the number of the folded tapes as in FIGS. 8 and 9 and/or having different cross-sectional areas by varying the size of the folded tapes as in FIG. 10; in each of the systems illustrated in FIGS. 8, 9, and 10, the folded tapes open at each plastic-to-plastic interface, as shown in FIG. 7. In such multi layers of folded tapes, the faces of the tapes are laminated metal-to-metal with any suitable adhesive 17, such as for example solvent-release polyethylene, rubber, polyester, polyvinyl chloride, or the like.

Figure 6:
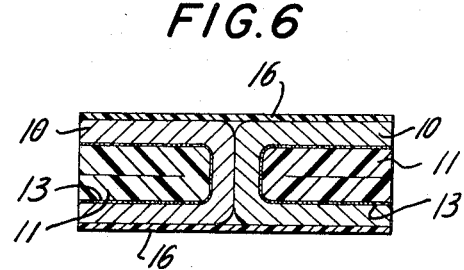
FIG. 6 is a cross-sectional view of an embodiment of a shielding tape showing two folded laminates of FIG. 1 with a plastic film on each face.
Figure 11:
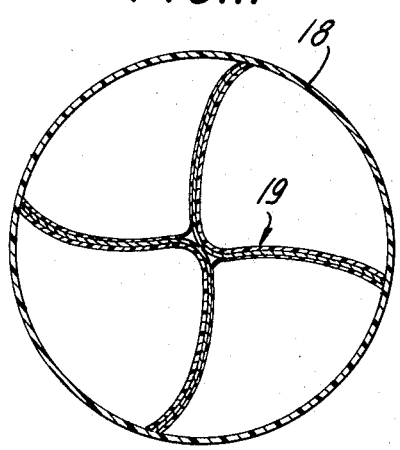
FIG. 11 is a cross-sectional view of a cable structure showing the cable jacket and four longitudinal cable compartments of equal size.

FIG. 11 illustrates an electrical cable comprising an outer jacket or sheath 18 made of an insulating material such as plastic, rubber, or the like, and a four-compartment shielding tape 19, for example, as shown in FIGS. 6 and 7.

Figure 10:
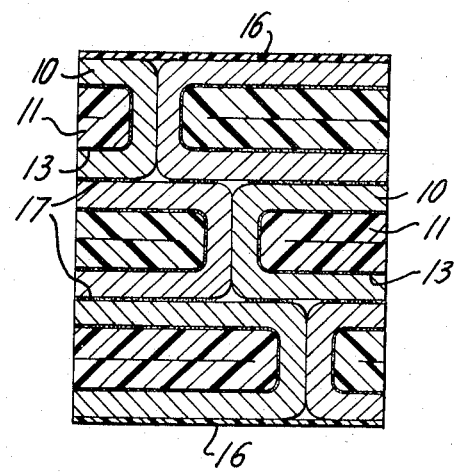
FIG. 10 is a cross-sectional view of an embodiment of a shielding tape showing a plurality of folded laminates of FIG. 1 of unequal lengths with a plastic film on the top and the bottom faces.
Figure 12:
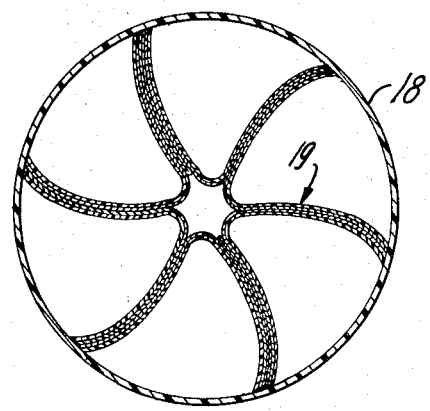
FIG. 12 is a cross-sectional view of a cable structure showing the cable jacket and six longitudinal cable compartments of unequal size.

FIG. 12 illustrates an electrical cable comprising an outer jacket or sheath 18 and a six-compartment shielding tape 19, for example, as shown in FIG. 10.

The shielding tapes described herein may be spliced in any suitable manner as long as there is shielding continuity; thus there may be used, for example, an electrical continuity penetration clamp to join the conducting material and a plastic film to join the insulating material.

By shielding a conductor, pairs of conductors, or groups of conductors as described above, maximum utilization of space and material weight is obtained; cable manufacturing speed is increased; the dual-foil encapsulation in several of the embodiments results in increased shielding effectiveness because of foil-interface reflectance; and foil corrosion is minimized in non-filled cable because moisture will not so readily reach the conductive foil.

Although there have been described preferred embodiments of this novel invention, many variations and modifications will now be apparent to those skilled in the art. This invention, therefore, is to be limited not by the specific disclosure herein but only by the appended claims.

What is claimed is:

1. A method of forming longitudinal multifinned tapes which comprises the steps of (1) laminating a metal foil to a plastic film, (2) folding the laminate from step (1) in half lengthwise plastic-to-plastic, (3) laying a plurality of the folded laminates fold-to-fold, and (4) laminating to each of the resulting faces of the folded laminates a plastic film cut to the width of the laminate of step (1), said folded tapes opening at each plastic-to-plastic interface to form a plurality of longitudinal parallel sections.

2. A method of forming longitudinal multifinned tapes which comprises the steps of (1) laminating a metal foil to a plastic film, (2) applying a heat-fusible coating to the metal foil, (3) cutting the resulting laminate to twice the width required, and (4) folding the laminate upon itself with the coated metal foil on the inside.

3. The method of claim 2 wherein the laminate from step (3) is folded upon itself from both edges and the edges are butted.

4. The method of claim 3 wherein the butted edges are covered with a strip of insulating film.

* * * * *

UNITED STATES PATENT OFFICE
CERTIFICATE OF CORRECTION

Patent No. 3,819,443            Dated June 25, 1974

Inventor(s) Herbert D. Simons and Frank E. Timmons

It is certified that error appears in the above-identified patent and that said Letters Patent are hereby corrected as shown below:

Column 2, line 46, change "1" to -- (1) --; line 63, change "laiminated" to -- laminated --.

In Figures 5 and 7 of sheet 1 of the drawings and in the drawing on the first page of the specification, extend the lead lines for reference numeral 10 as indicated below:

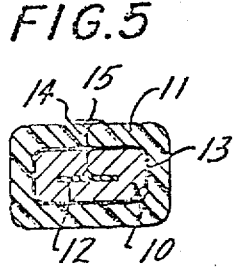
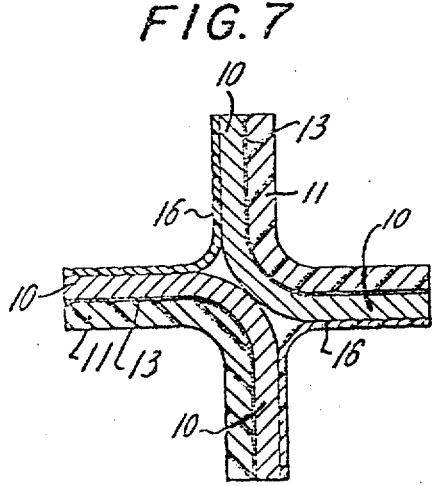
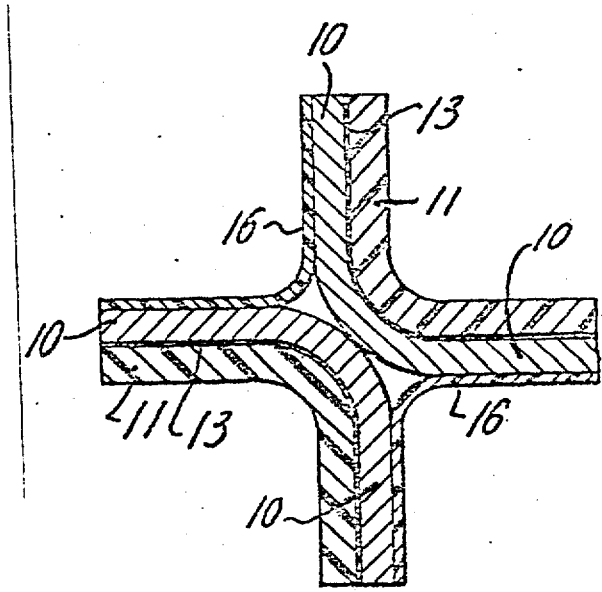

Signed and sealed this 27th day of May 1975.

(SEAL)
Attest:

RUTH C. MASON
Attesting Officer

C. MARSHALL DANN
Commissioner of Patents
and Trademarks